US012704922B2

(12) United States Patent
Zhao et al.

(10) Patent No.: US 12,704,922 B2
(45) Date of Patent: Aug. 11, 2026

(54) METHOD AND APPARATUS FOR INCREASING TOUCH RESPONSE SPEED

(71) Applicant: HONOR DEVICE CO., LTD., Shenzhen (CN)

(72) Inventors: Guangxu Zhao, Shenzhen (CN); Yue Ding, Shenzhen (CN); Juncheng Tian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 33 days.

(21) Appl. No.: 18/841,190

(22) PCT Filed: Apr. 13, 2023

(86) PCT No.: PCT/CN2023/088021
§ 371 (c)(1),
(2) Date: Aug. 23, 2024

(87) PCT Pub. No.: WO2024/021684
PCT Pub. Date: Feb. 1, 2024

(65) Prior Publication Data

US 2025/0199638 A1 Jun. 19, 2025

(30) Foreign Application Priority Data

Jul. 28, 2022 (CN) ......................... 202210898483.6

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .... G06F 3/0416; G06F 3/04166; G06F 3/044; G06F 3/0446
See application file for complete search history.

(56) References Cited

U.S. PATENT DOCUMENTS

2012/0050216 A1 3/2012 Kremin et al.
2013/0057507 A1 3/2013 Shin et al.
(Continued)

FOREIGN PATENT DOCUMENTS

CN 102981685 A 3/2013
CN 105653085 A 6/2016
(Continued)

*Primary Examiner* — Robin J Mishler
(74) *Attorney, Agent, or Firm* — Fish & Richardson P.C.

(57) ABSTRACT

This application provides a method and an apparatus for increasing a touch response speed. In this method, after a part of transmit channels are scanned, touch data obtained through scanning is immediately transmitted to an application processor. In addition, a subsequent transmit channel scanning process is performed while the touch data is transmitted, so that the transmit channel scanning process and the touch data transmission process are performed synchronously. After all transmit channels are scanned, a part of touch data obtained through the last scanning needs to be transmitted. Time required for transmitting a part of touch data is far less than time required for transmitting all touch data. Therefore, additional time required for transmitting data to the application processor is greatly reduced, so that time required for an entire touch response process is reduced, and a response speed of a touch operation is finally increased.

19 Claims, 10 Drawing Sheets

(56) References Cited

U.S. PATENT DOCUMENTS

| | | | | |
|---|---|---|---|---|
| 2015/0109227 | A1 | 4/2015 | Shin et al. | |
| 2015/0277631 | A1 | 10/2015 | Oishi et al. | |
| 2016/0283034 | A1 | 9/2016 | Kumar | |
| 2018/0107292 | A1 | 4/2018 | Jang et al. | |
| 2018/0150168 | A1* | 5/2018 | Jung | H03M 1/12 |
| 2018/0181229 | A1 | 6/2018 | Kwon et al. | |
| 2019/0138148 | A1 | 5/2019 | Kwon | |
| 2022/0066591 | A1 | 3/2022 | Meng et al. | |
| 2022/0206625 | A1* | 6/2022 | Park | G06F 3/0412 |

FOREIGN PATENT DOCUMENTS

| | | | |
|---|---|---|---|
| CN | 107102776 | A | 8/2017 |
| CN | 109992315 | A | 7/2019 |
| CN | 110737518 | A | 1/2020 |
| CN | 111082809 | A | 4/2020 |
| CN | 111417920 | A | 7/2020 |
| CN | 111813270 | A | 10/2020 |
| CN | 112068739 | A | 12/2020 |
| CN | 112799546 | A | 5/2021 |

* cited by examiner

120
Memory
110
Processor
130
Touchscreen

METHOD AND APPARATUS FOR INCREASING TOUCH RESPONSE SPEED

CROSS-REFERENCE TO RELATED APPLICATIONS

This application is a national stage of International Application No. PCT/CN2023/088021, filed on Apr. 13, 2023, which claims priority to Chinese Patent Application No. 202210898483.6, filed on Jul. 28, 2022. The aforementioned disclosures are hereby incorporated by reference in their entireties.

TECHNICAL FIELD

This application relates to the field of computer technologies, and in particular, to a method and an apparatus for increasing a touch response speed.

BACKGROUND

Touchscreens are widely applied to portable terminal devices, and a touch operation is a main input manner of human-computer interaction of the portable terminal device. As a user imposes an increasingly high requirement on a response speed in a touch interaction scenario, improving a touch response speed becomes one of important optimization points for the portable terminal device.

SUMMARY

In view of this, this application provides a method and an apparatus for increasing a touch response speed, to resolve at least a part of the foregoing technical problems. The disclosed technical solutions are as follows:

According to a first aspect, this application provides a method for increasing a touch response speed, applied to an electronic device, where the electronic device includes a touchscreen, a touch chip, and an application processor, the touchscreen includes a plurality of transmit channels and a plurality of receive channels, and the method includes: The touch chip scans one transmit channel group to obtain a touch data set, where a quantity of transmit channels included in the transmit channel group is less than a quantity of all transmit channels of the touchscreen, and the touch data set includes parameters of equivalent capacitances between all receive channels and currently scanned transmit channels; the touch chip scans, in a process of transmitting the touch data set to the application processor, a next transmit channel group until all transmit channel groups are scanned; and the application processor sequentially receives touch data sets corresponding to the transmit channel groups, until the touch data sets corresponding to all the transmit channel groups are received, and then obtains touch location information corresponding to a touch operation on the touchscreen. It may be learned that, in this solution, in a process in which a part of (for example, one of or one group of) the transmit channels are scanned and a subsequent transmit channel continues to be scanned, touch data obtained from a scanned channel is transmitted to the application processor, that is, a touch data transmission process and a scanning process are performed synchronously. In this way, after all the transmit channels are scanned, only touch data obtained through the last scanning (namely, a part of touch data) needs to be transmitted, and time required for transmitting a part of touch data is far less than time required for transmitting all touch data. Therefore, in this solution, time consumed in the data transmission process is reduced, so that time consumed in an entire touch response process is reduced, and a response speed of a touch operation is finally increased.

In a possible implementation of the first aspect, that the application processor sequentially receives touch data sets corresponding to the transmit channel groups, until the touch data corresponding to all the transmit channels is received, and obtains touch location information corresponding to a touch operation on the touchscreen includes: After receiving a touch data set corresponding to one transmit channel group, the application processor processes the touch data set by using a touch data preprocessing algorithm, until the touch data sets corresponding to all the transmit channel groups are received, and then obtains, through calculation based on the touch data sets corresponding to all the transmit channels, the touch location information corresponding to the touch operation. In this way, the application processor first preprocesses a part of received touch data, and does not need to perform processing until all the touch data is received, so that a data processing process, the scanning process, and the data transmission process are performed synchronously. It may be learned that, in this solution, additional time required in the data processing process is further shortened on the basis of shortening additional time required for transmitting the touch data. Therefore, in this solution, time consumed in an entire touch response process is further shortened, that is, a response speed of a touch operation is further increased.

In another possible implementation of the first aspect, that the touch chip transmits the touch data set to the application processor includes: The touch chip performs compression processing on the touch data set by using a preset compression algorithm, and transmits compressed touch data to the application processor; and that the application processor sequentially receives touch data sets corresponding to the transmit channel groups, until the touch data corresponding to all the transmit channels is received, and obtains touch location information corresponding to a touch operation on the touchscreen includes: After receiving the compressed touch data, the application processor performs decompression processing on the compressed touch data by using a preset decompression algorithm; and after receiving decompressed touch data corresponding to all the transmit channel groups, the application processor obtains, through calculation, the touch location information corresponding to the touch operation. It may be learned that, in this solution, touch data transmission and transmit channel scanning are performed synchronously, and compression processing is performed before the touch data is transmitted, so that additional time required in the data transmission process is further shortened. Therefore, time consumed in an entire touch response process is further reduced, and a response speed of a touch operation is further increased.

In still another possible implementation of the first aspect, the transmit channel group includes one transmit channel, and the touch data set is one piece of touch data obtained by scanning one transmit channel; and that the touch chip scans, in a process of transmitting the touch data set to the application processor, a next transmit channel group until all transmit channel groups are scanned includes: In a process in which the touch chip transmits one piece of obtained touch data to the application processor, the touch chip continues to scan a next transmit channel group until all the transmit channel groups are scanned. It may be learned that, in this solution, each time after one transmit channel is scanned, touch data obtained by scanning the channel is immediately transmitted to the application processor. In this way, after all the transmit channels are scanned, only data of the last channel is not transmitted, that is, additional time required for data transmission is only time required for transmitting the touch data of the last channel. This minimizes time consumed in the data transmission process, and greatly increases a response speed of a touch operation.

In yet another possible implementation of the first aspect, the transmit channel group includes a plurality of transmit channels, and the touch data set is one group of touch data obtained by scanning a plurality of transmit channels; and that the touch chip scans, in a process of transmitting the touch data set to the application processor, a next transmit channel group until all transmit channel groups are scanned includes: In a process in which the touch chip transmits one group of obtained touch data to the application processor, the touch chip simultaneously scans transmit channels in a next transmit channel group, until all the transmit channel groups are scanned. It may be learned that, in a multi-channel drive manner, in this solution, time consumed in the data transmission process is minimized, and a response speed of a touch operation is greatly increased.

In another possible implementation of the first aspect, the transmit channel group includes a plurality of transmit channels, and the touch data set is one group of touch data obtained by scanning a plurality of transmit channels; and that the touch chip scans, in a process of transmitting the touch data set to the application processor, a next transmit channel group until all transmit channel groups are scanned includes: In a process in which the touch chip transmits one group of obtained touch data to the application processor, the touch chip sequentially scans transmit channels in a next transmit channel group, until all the transmit channel groups are scanned.

In still another possible implementation of the first aspect, a touch drive module and a touch algorithm module are run in the application processor; that the touch chip transmits the touch data set to the application processor includes: The touch chip transmits the touch data set to the touch drive module; and that the application processor sequentially receives touch data sets corresponding to the transmit channel groups, until the touch data sets corresponding to all the transmit channel groups are received, and then obtains touch location information corresponding to a touch operation on the touchscreen includes: The touch drive module sequentially receives touch data sets corresponding to transmit channels, and transmits the touch data sets to the touch algorithm module; and the touch algorithm module sequentially receives the touch data sets corresponding to the transmit channels, and obtains, based on the touch data corresponding to all the transmit channels, the touch location information corresponding to the touch operation.

In yet another possible implementation of the first aspect, that the touch chip transmits the touch data set to the touch drive module includes: The touch chip performs compression processing on the touch data set by using the preset compression algorithm, and transmits compressed touch data to the touch drive module; and that the touch drive module sequentially receives touch data sets corresponding to transmit channels, and transmits the touch data sets to the touch algorithm module includes: After receiving the compressed touch data, the touch drive module performs decompression processing on the compressed touch data by using the preset decompression algorithm, and transmits decompressed data to the touch algorithm module.

In another possible implementation of the first aspect, that the touch algorithm module sequentially receives the touch data sets corresponding to the transmit channels, and obtains, based on the touch data corresponding to all the transmit channels, the touch location information corresponding to the touch operation includes: After receiving a touch data set corresponding to one transmit channel group, the touch algorithm module processes the touch data set by using the touch data preprocessing algorithm, until the touch data sets corresponding to all the transmit channel groups are received, and then obtains, through calculation based on the touch data sets corresponding to all the transmit channels, the touch location information corresponding to the touch operation.

In still another possible implementation of the first aspect, an input module and a first application are run in the application processor, and the method further includes: The touch algorithm module transmits the touch location information to the input module by using the touch drive module; and the input module transmits the touch location information to the first application, so that the first application responds to the touch operation based on the touch location information, where the first application is an application running in the foreground of the electronic device.

According to a second aspect, this application further provides an electronic device, where the electronic device includes one or more processors, a memory, and a touchscreen, the memory is configured to store program code, and the processor is configured to run the program code, to enable the electronic device to implement the method for increasing a touch response speed according to any one of the implementations of the first aspect.

According to a third aspect, this application further provides a computer-readable storage medium, storing instructions, where when the instructions are run on an electronic device, the electronic device is enabled to perform the method for increasing a touch response speed according to any one of the implementations of the first aspect.

According to a fourth aspect, this application further provides a computer program product, storing instructions, where when the computer program product is run on an electronic device, the electronic device is enabled to perform the method for increasing a touch response speed according to any one of the implementations of the first aspect.

It should be understood that descriptions of technical features, technical solutions, beneficial effects, or similar expressions in this application do not imply that all features and advantages can be achieved in any single embodiment. On the contrary, it may be understood that descriptions of features or beneficial effects mean that specific technical features, technical solutions or beneficial effects are included in at least one embodiment. Therefore, the descriptions of the technical features, the technical solutions, or the beneficial effects in the specification do not necessarily mean the same embodiment. Further, the technical features, the technical solutions, and the beneficial effects described in the embodiments may be combined in any appropriate manner. A person skilled in the art should understand that an embodiment may be implemented without one or more specific technical features, technical solutions, or beneficial effects in a specific embodiment. In other embodiments, additional technical features and beneficial effects may also be identified in specific embodiments that do not reflect all embodiments.

BRIEF DESCRIPTION OF DRAWINGS

To describe the technical solutions in embodiments of the present invention or the conventional technology more clearly, the following briefly describes the accompanying drawings required for describing the embodiments or the conventional technology. It is clear that, the accompanying drawings in the following description show some embodiments of the present invention, and a person of ordinary skill in the art may still derive other drawings from these accompanying drawings without creative efforts.

DESCRIPTION OF EMBODIMENTS

The terms "first", "second", "third", and the like in the specification, claims, and accompanying drawings of this application are used to distinguish between different objects, but are not used to limit a specific sequence.

In the embodiments of this application, words such as "example" or "for example" are used to indicate giving an example, an illustration, or a description. Any embodiment or design solution described as "example" or "for example" in the embodiments of this application should not be construed as being more preferred or advantageous than other embodiments or design solutions. Exactly, the words such as "example" or "for example" are used to present related concepts in a specific manner.

Figure 1:
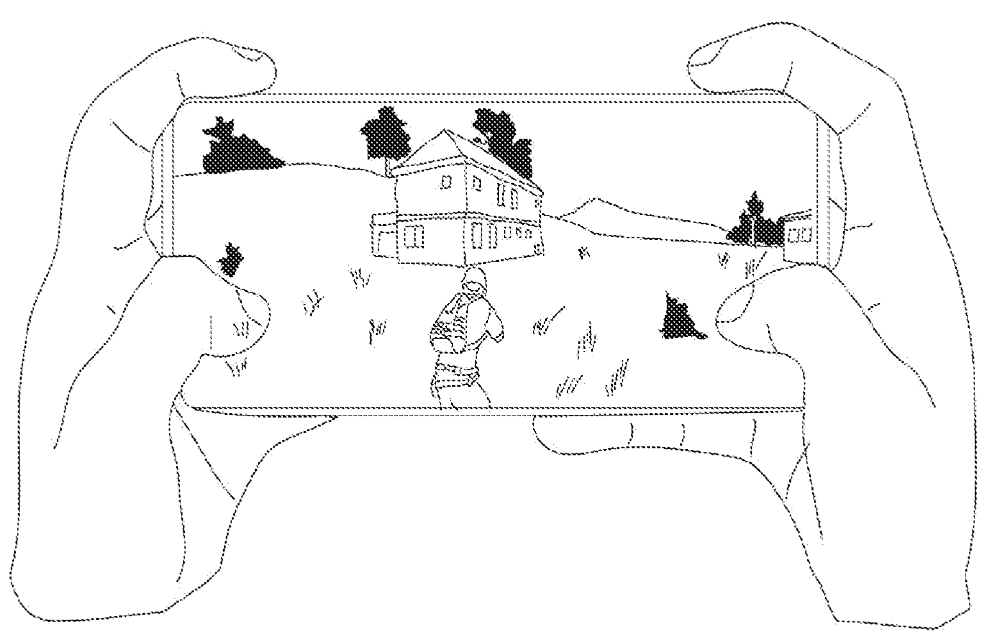
FIG. 1 is a schematic diagram of a scenario in which a game APP is run on an electronic device according to an embodiment of this application.

An example in which a portable terminal device is a mobile phone is used. As shown in FIG. 1, in a scenario in which a game APP is run on a mobile phone, a touch response speed of the mobile phone directly affects game experience of a user. In a current touch host processing (Touch Host Processing, THP) solution, namely, a THP solution, the following steps are included for completing one touch coordinate reporting process:

(1) Perform Hardware Scanning.

Figure 2:
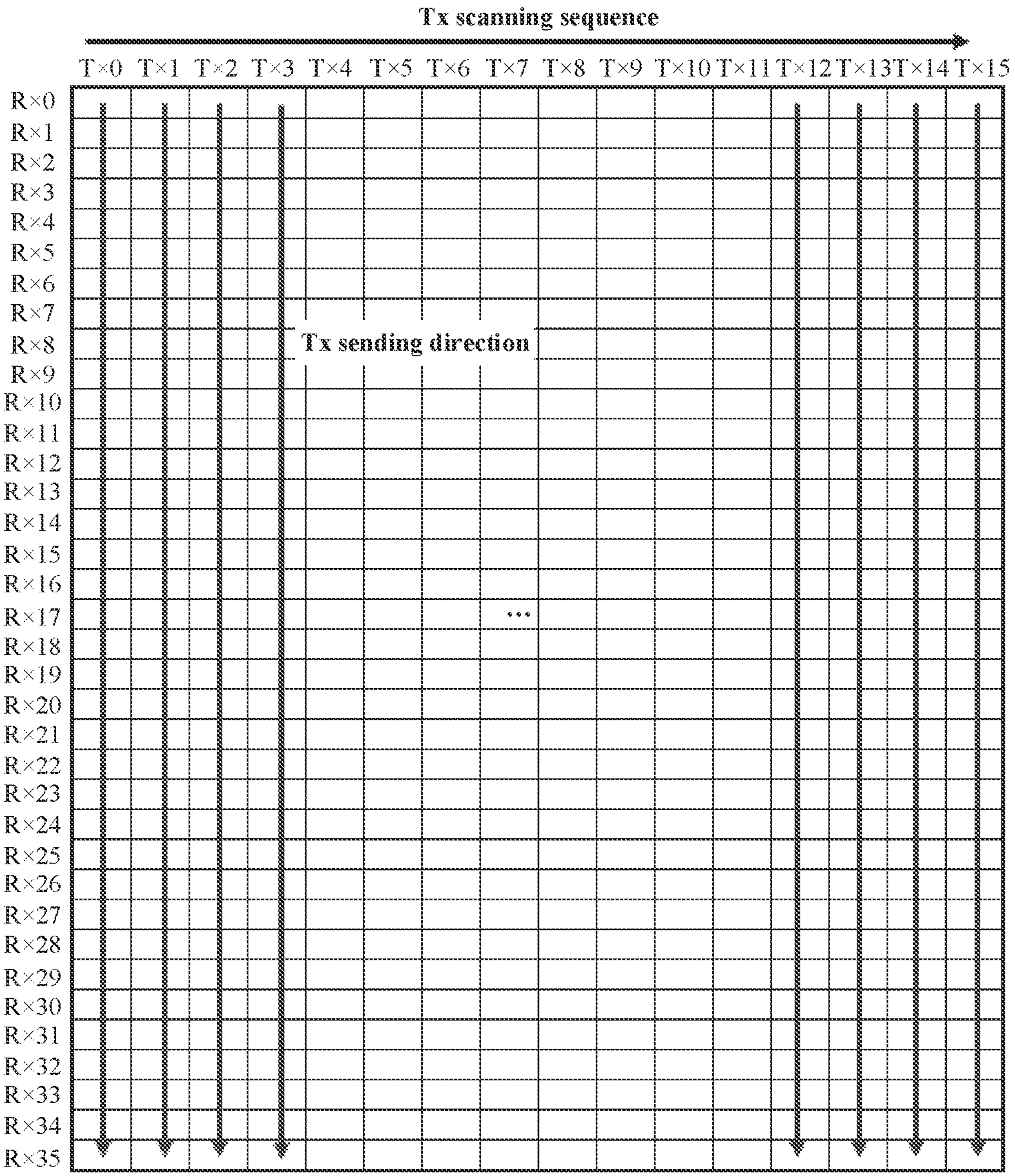
FIG. 2 is a schematic diagram of a transmit channel and a receive channel of a touchscreen according to an embodiment of this application.

As shown in FIG. 2, a touchscreen includes transmit electrodes (Tx0~TxN) and receive electrodes (Rx0~RxN) that are perpendicular to each other, where the transmit electrode may be referred to as a transmit channel, and the receive electrode is also referred to as a receive channel. The transmit electrode and the receive electrode are transparent and conductive materials, and are conductors without affecting display content on a lower display screen. A large induction capacitor exists at an intersection between each transmit channel (Tx) and each receive channel (Rx).

A hardware scanning process is a process in which a touch chip sequentially drives the transmit channels (Tx0~TxN) of the touchscreen to perform scanning, that is, sequentially applies a drive signal to the transmit channels.

When an electrical pulse signal with a specific amplitude is applied to a transmit channel, all receive channels receive the signal by using induction capacitors of intersections. A signal at an intersection is only associated with a location of a transmit channel. When a conductor with a specific area or a finger is used to approach (or touch) an intersection, an induction capacitor of the intersection discharges a voltage to the ground. Consequently, an equivalent capacitance of the intersection is decreased. The channels Tx0~TxN are sequentially scanned, and corresponding capacitance data is received on the receive channels Rx. Each piece of touch data includes capacitance data between a currently driven transmit channel and each receive channel.

(2) Transmit Touch Data.

After completing one time of scanning for the channels Tx0~TxN, the touch chip reports, to an application processor, all data received on Rx. A touch status of an intersection can be detected by comparing capacitor signals existing before and after touch, and finally coordinates of at least one touched intersection may be determined.

(3) A Touch Algorithm Service Processes the Touch Data to Obtain Touch Coordinates.

After receiving the touch data, the application processor performs corresponding processing by using the touch algorithm service, and finally calculates coordinates corresponding to a touch location.

(4) Report the Touch Coordinates to an Upper-Layer Application.

Figures 3, 4:
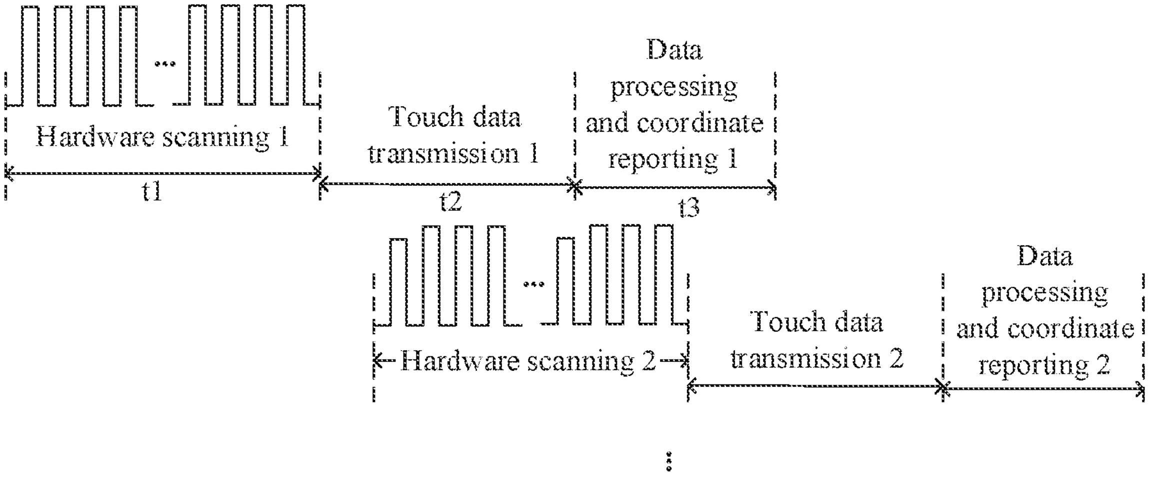
FIG. 3 is a time sequence diagram of steps in a touch response process.
FIG. 4 is a schematic diagram of a structure of an electronic device according to an embodiment of this application.

FIG. 3 is a time sequence diagram of completing one touch coordinate reporting process in a current THP solution. As shown in FIG. 3, t1 is time required for completing one time of hardware scanning, that is, time required for sequentially scanning the transmit channels Tx0~Tx15 shown in FIG. 2; 12 is time required by the touch chip to transmit, to the application processor, all touch data obtained in a current round of scanning; and t3 is time required for obtaining touch coordinates based on the touch data and reporting the touch coordinates to the application. It may be learned that, in the current THP solution, total time required for completing one touch coordinate reporting process is $T_{total}$=t1+t2+t3. It may be learned that, in the current THP solution, long time is required in a process from detecting a touch operation to obtaining touch coordinates corresponding to the current touch operation, causing a slow touch response speed.

To resolve the problem of the slow touch response speed, this application provides a method for increasing a touch response speed. In this solution, after a part of transmit channels are scanned, obtained touch data is immediately transmitted to an application processor. In addition, subsequent transmit channel scanning is continued while the touch data is transmitted, so that a scanning process and a touch data transmission process are performed synchronously. After all transmit channels are scanned, only touch data obtained through the last scanning needs to be transmitted, that is, after all the transmit channels are scanned, additional time required for transmitting touch data is time required for transmitting the touch data obtained through the last scanning (namely, a part of touch data). Time required for transmitting a part of touch data is far less than time required for transmitting all touch data. Therefore, in this solution, data transmission time is greatly reduced, so that time consumed in an entire touch response process is reduced, and a response speed of a touch operation is finally increased.

In some embodiments, an electronic device to which the method for increasing a touch response speed provided in this application may be applied may be a device with a touchscreen, such as a mobile phone, a tablet computer, a desktop/laptop personal computer, a notebook computer, a handheld computer, a netbook, a personal digital assistant (Personal Digital Assistant, PDA), a wearable electronic device, or a smartwatch.

FIG. 4 is a schematic diagram of a structure of an electronic device according to an embodiment of this application.

As shown in FIG. 4, the electronic device may include a processor 110, a memory 120, and a touchscreen 130.

The processor 110 may include one or more processing units. For example, the processor 110 may include an application processor (application processor, AP), a graphics processing unit (graphics processing unit, GPU), an image signal processor (image signal processor, ISP), or the like. Different processing units may be independent components, or may be integrated into one or more processors.

The memory 120 may be configured to store computer-executable program code, and the executable program code includes instructions. The processor 110 runs the instructions stored in the memory 120, to perform various function applications and data processing of the electronic device. For example, in this embodiment, the processor 110 may run the instructions in the memory 120, to perform the method for increasing a touch response speed provided in this application.

The touchscreen 130 may include a touch sensor and a display screen. The touch sensor is configured to detect a touch operation performed on or near the touch sensor. The touch sensor may transmit the detected touch operation to the application processor to determine a type of a touch event. A visual output related to the touch operation is provided by using the display screen.

In some embodiments, the touch sensor may be disposed on the display screen. In some other embodiments, the touch sensor may alternatively be disposed on a surface of the electronic device, and is located on a location different from that of the display screen.

In addition, an operating system runs on the foregoing components. An application may be installed and run on the operating system.

An operating system of the electronic device may use a layered architecture, an event-driven architecture, a micro-kernel architecture, a micro-service architecture, or a cloud architecture. In this embodiment of this application, an Android® system with the layered architecture is used as an example to describe a software structure of the electronic device.

Figure 5:
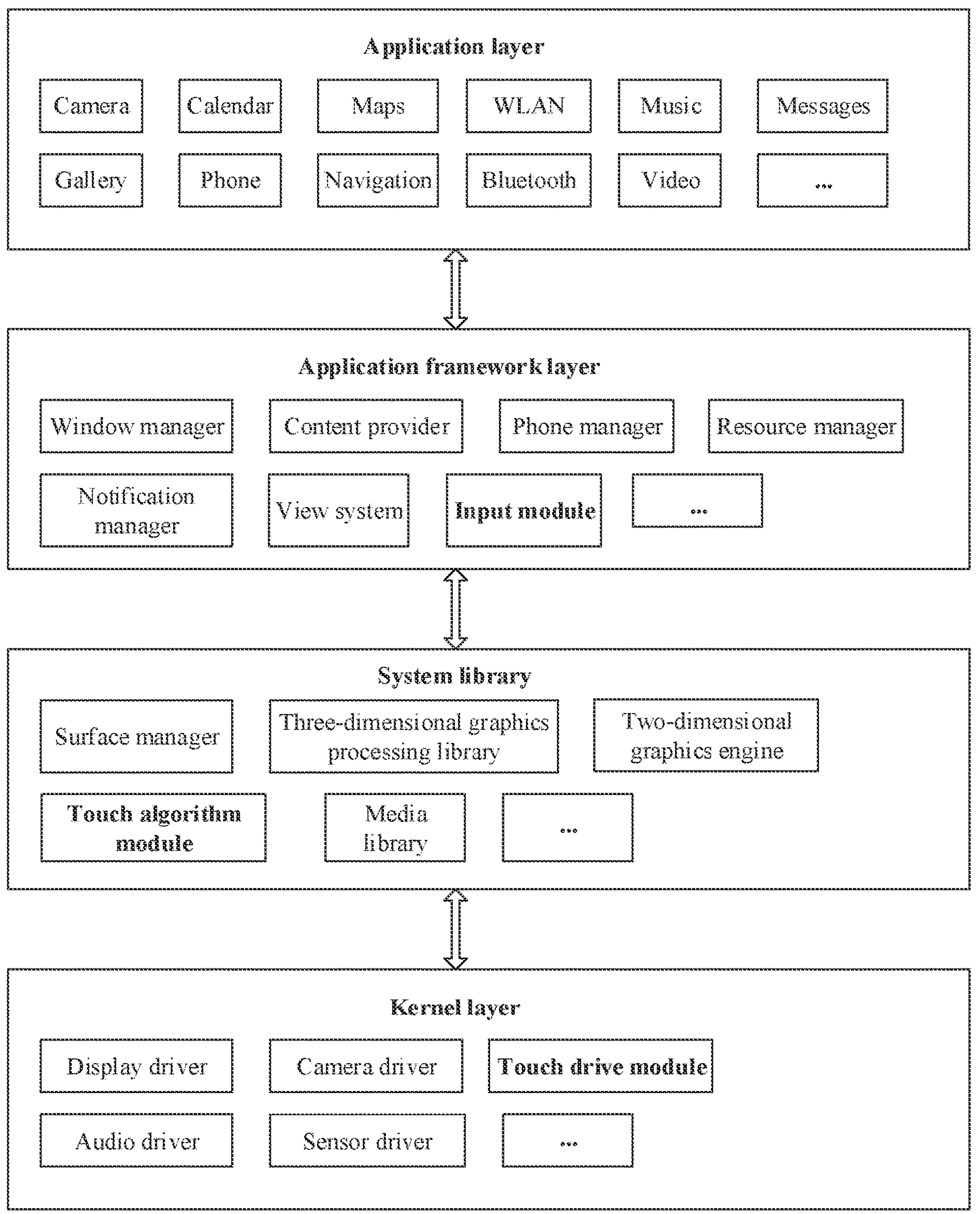
FIG. 5 is a block diagram of a software structure of an electronic device according to an embodiment of this application.

FIG. 5 is a block diagram of a software structure of an electronic device according to an embodiment of this application.

In a layered architecture, software is divided into several layers, and each layer has a clear role and task. The layers communicate with each other by using a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 5, the application packages may include applications such as Camera, Gallery, Calendar, Phone, Maps, Navigation, WLAN, Bluetooth, Music, Video, and Messages.

The application framework layer provides an application programming interface (application programming interface, API) and a programming framework for the applications at the application layer. The application framework layer includes some predefined functions. As shown in FIG. 3, the application framework layer may include an Input module, a window manager, a content provider, a view system, a phone manager, a resource manager, a notification manager, and the like.

In a touch scenario in this embodiment, the application framework layer may provide an API related to a touch function for the application layer, and provide a touch interface management service for the application layer, to implement the touch function. For example, data related to a touch operation may be transferred to a related application at the application layer by using the Input module.

The Android runtime includes a kernel library and a virtual machine. The Android runtime is responsible for scheduling and management of the Android system.

The kernel library includes two parts: One part is a functional function that needs to be invoked in a java language, and the other part is a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, for example, a touch algorithm module, a surface manager (surface manager), a media library (Media Libraries), a three-dimensional graphics processing library (for example, OpenGL ES), and a 2D graphics engine (for example, SGL).

The touch algorithm module is configured to process touch data to obtain touch coordinates.

The kernel layer is a layer between hardware and software. The kernel layer includes at least a touch driver, a display driver, a camera driver, an audio driver, and a sensor driver.

A hardware layer may include hardware apparatuses such as a touch control screen, a touch chip, and a display screen. The touch control screen and the display screen may constitute a touch display screen (namely, a touchscreen). The touch chip is configured to collect touch data of the touch control screen.

It should be noted that, although the embodiments of this application are described by using the Android system as an example, the basic principle thereof is also applicable to an electronic device based on another operating system.

The following describes the embodiments of this application in detail with reference to FIG. 6 to FIG. 11. For case of description, an example in which the electronic device is a mobile phone is used below for description.

Figure 6:
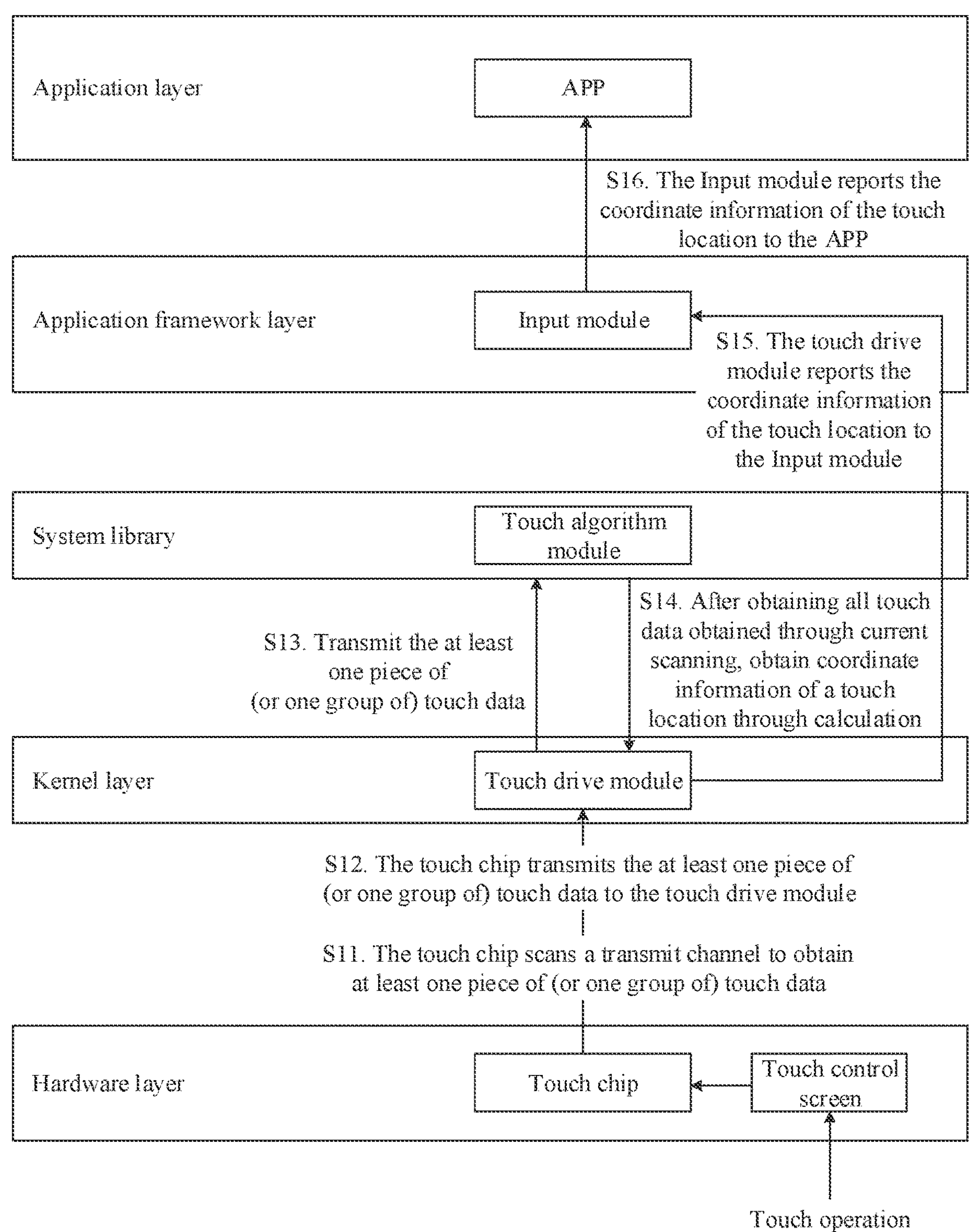
FIG. 6 is a flowchart of a method for increasing a touch response speed according to an embodiment of this application.

FIG. 6 is a flowchart of a method for increasing a touch response speed according to an embodiment of this application. As shown in FIG. 6, the method for increasing a touch response speed may include the following steps:

S11. A touch chip scans a transmit channel to obtain at least one piece of (or one group of) touch data.

A touchscreen sequentially scans transmit channels (Tx0~TxN) at a specific frequency, that is, sequentially applies a drive signal to transmit channels. In each time of scanning, a corresponding signal, namely, touch data, is received on all receive channels Rx.

Each piece of touch data includes capacitance data between a currently driven transmit channel and each receive channel. A length of the touch data depends on a quantity of receive channels Rx. A larger quantity of Rx indicates a larger length of the touch data. A smaller quantity of Rx indicates a smaller length of the touch data.

When a drive signal is applied to one transmit channel (or one group of transmit channels), the signal is received on all receive channels by using induction capacitors of intersections (intersections between the receive channels and the transmit channel). All transmit channels are scanned once in the foregoing manner, and received information of each intersection is recorded. When a finger or a conductor (such as a stylus) touches (or approaches) an intersection, an induction capacitor of the intersection discharges a voltage to the ground. Consequently, an equivalent capacitance of the intersection is decreased. A touch status of an intersection may be determined by comparing capacitance information existing before touch, and coordinates of the touched intersection are calculated.

In a possible implementation, the touch chip may scan the transmit channel in a single-channel manner, that is, a scanning drive signal is applied to only one transmit channel once. In this drive manner, one piece of touch data may be obtained each time after one transmit channel is scanned.

In another possible implementation, the touch chip may scan the transmit channel in a multi-channel drive manner, that is, an orthogonal multi-phase scanning drive signal may be simultaneously applied to one group of (a plurality of) transmit channels. In this drive manner, one group of touch data may be obtained each time after one group of transmit channels is scanned. One group of touch data includes a plurality of pieces of touch data, and each piece of touch data includes a currently driven transmit channel and capacitance data of receive channels.

S12. The touch chip transmits the at least one piece of (or one group of) touch data to a touch drive module.

The touch chip reports, to the touch drive module by using a communication bus, one piece of touch data or one group of touch data obtained on the receive channel when a current transmit channel is scanned.

In some embodiments, the communication bus between the touch chip and the touch drive module may be a serial peripheral interface (serial peripheral interface, SPI) or an I2C bus. A type of the communication bus is not limited in this application. The touch drive module is a software module that is run on an application processor.

In some embodiments, the touch drive module may immediately report one piece of obtained touch data or one group of obtained touch data to the touch drive module after scanning one transmit channel or one group of transmit channels. For example, after one transmit channel (or one group of transmit channels) is scanned, when a next transmit channel (or a next group of transmit channels) is scanned, touch data obtained from a previous transmit channel (or a previous group of transmit channels) is reported to the touch drive module.

In some other embodiments, the touch drive module may report a plurality of pieces of obtained touch data or a plurality of groups of obtained touch data to the touch drive module after scanning a plurality of or a plurality of groups of transmit channels. For example, after two transmit channels are scanned, when the third transmit channel is scanned, touch data obtained from the first two scanned transmit channels is reported to the touch drive module.

Figure 7:
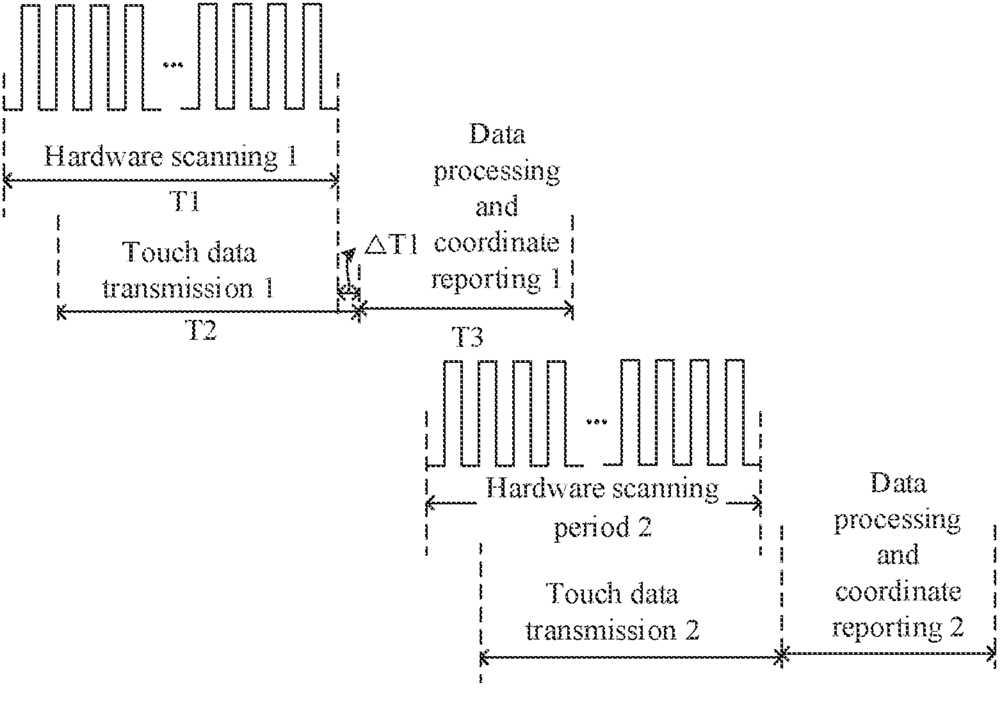
FIG. 7 is a time sequence diagram of processes for performing a touch response by using the method shown in FIG. 6.

As shown in FIG. 7, T1 is time required for scanning all transmit channels, T2 is time required for transmitting all touch data, a part of T2 that exceeds T1 is denoted as ΔT1, and ΔT1 is additional time required for transmitting touch data after all the transmit channels are scanned. It may be learned that the time period T1 and the time period T2 partially overlap, that is, a hardware scanning process and a touch data transmission process may be performed synchronously. In other words, after all the transmit channels are scanned, time required for transmitting touch data is only time required for transmitting data obtained through the last scanning, namely, ΔT1.

S13. The touch drive module transmits the at least one piece of (or one group of) touch data to a touch algorithm module.

After receiving the touch data transmitted by the touch chip, the touch drive module immediately transmits the touch data to the touch algorithm module.

Each time after one transmit channel is scanned or one group of transmit channels are scanned, steps in S11~S13 need to be performed until all the transmit channels are scanned.

S14. After receiving all touch data obtained in a current round of scanning, the touch algorithm module obtains touch location information through calculation, and transmits the touch location information to the touch drive module.

The touch algorithm module is configured to process touch data to obtain touch coordinates. After all the transmit channels are scanned and all the touch data is obtained, the touch algorithm module processes all received touch data to obtain coordinates corresponding to a touch location at which the finger touches the touchscreen. The coordinates may also be referred to as touch coordinates. In addition, information such as a touch pressure value of a touch operation and a tilt angle value between the finger and the touch control screen may be further obtained.

Finally, the touch algorithm module transmits the obtained touch location information to the touch drive module.

S15. The touch drive module transmits the received coordinate information of the touch location to an Input module.

The Input module is located at an application framework layer, and is configured to transfer data related to the touch operation to an application at an application layer.

The touch drive module transfers the received touch coordinates to the Input module at the application framework layer, so that the Input module reports, to a corresponding application, the touch coordinates corresponding to the current touch operation.

S16. The Input module reports the touch location information to an application.

The Input module reports, to a target application, the touch location information corresponding to the current touch operation. The target application herein is an application that is run in foreground. For example, in the application scenario shown in FIG. 1, the application that is run in the foreground is a game APP.

The target application obtains the touch coordinates corresponding to the current touch operation, and may further perform corresponding response processing based on the touch coordinates.

For example, in the application scenario shown in FIG. 1, when the game APP is run on the mobile phone, the user performs a touch operation in an interface of the game APP. After receiving touch coordinates of the touch operation, the game APP performs corresponding response processing, for example, adjusts a location of a game character.

As shown in FIG. 7, T3 is time required in a process of touch data processing and coordinate reporting. It may be learned that, in the embodiment shown in FIG. 6, total time $T_{total}$ required for completing one touch coordinate reporting process is T1+ΔT1+T3. It may be learned that $T_{total}$ shown in FIG. 7 is far less than $T_{total}$ shown in FIG. 3.

According to the method for increasing a touch response speed provided in this embodiment, in a process in which a part of (for example, one of or one group of) the transmit channels are scanned and a subsequent transmit channel continues to be scanned, touch data obtained through current scanning is transmitted to an upper layer, that is, touch data that has been obtained is transmitted while a next transmit channel (or a next group of transmit channels) is scanned, so that touch data transmission and transmit channel scanning are performed synchronously. After all the channels are scanned, only touch data of the last channel Tx (or the last group of channels Tx) needs to be transmitted, that is, time consumed in the touch data transmission process is equivalent to time required for transmitting the last piece of (or the last group of) touch data. Therefore, data transmission time is greatly reduced, so that time consumed in an entire touch response process is reduced, and a response speed of a touch operation is finally increased.

To further reduce time required in the touch data transmission process, this application further provides another embodiment of a method for increasing a touch response speed. On the basis of the embodiment shown in FIG. 6, in this embodiment, a touch data processing process is further performed in advance, so that the touch data processing process is partially synchronous with the scanning process.

Figure 8:
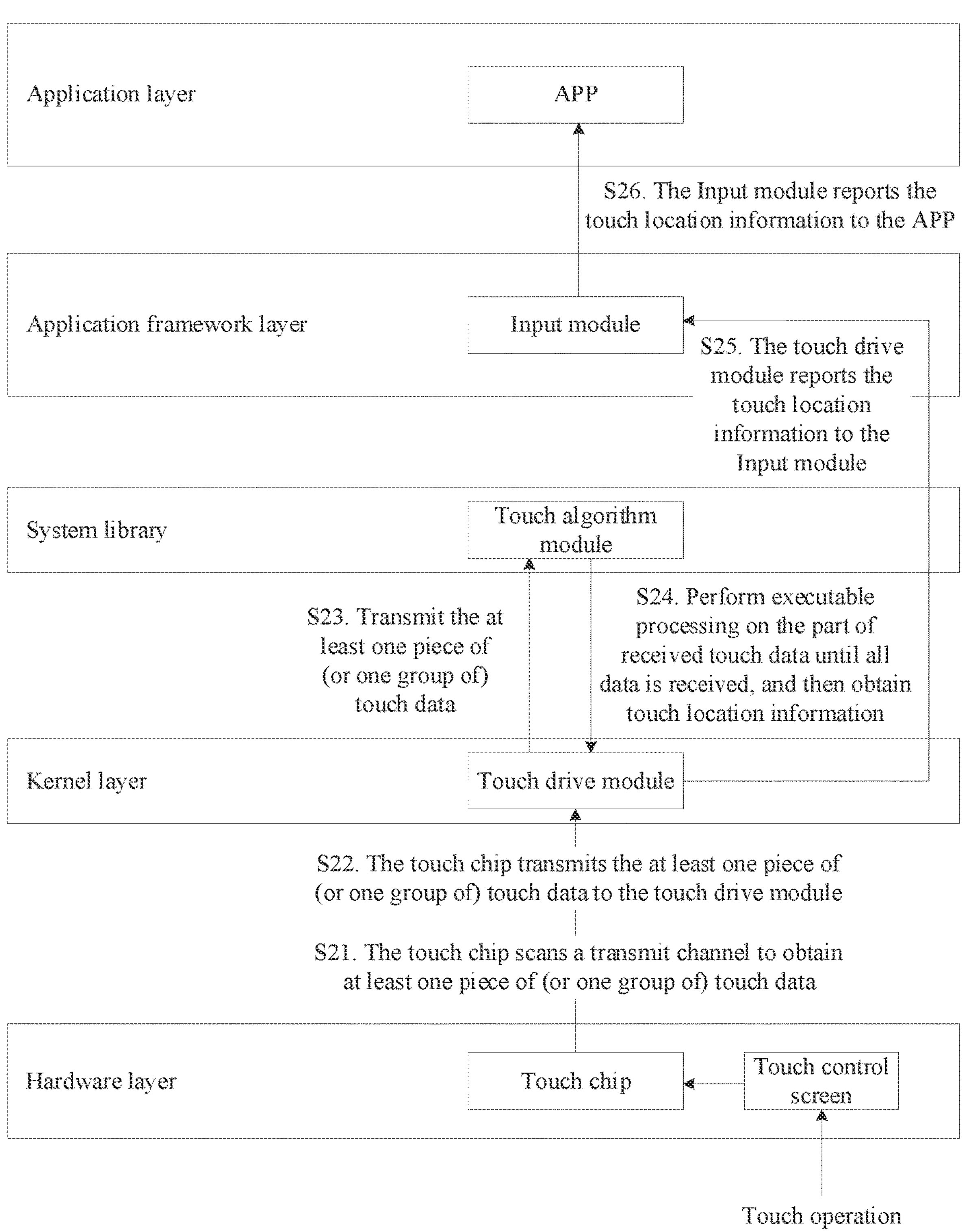
FIG. 8 is a flowchart of another method for increasing a touch response speed according to an embodiment of this application.

FIG. 8 is a flowchart of another method for increasing a touch response speed according to an embodiment of this application.

As shown in FIG. 8, the method for increasing a touch response speed in this embodiment may include the following steps:

S21. A touch chip scans a transmit channel to obtain at least one piece of (or one group of) touch data.

S22. When scanning another transmit channel, the touch chip transmits at least one piece of (or one group of) obtained touch data to a touch drive module.

For example, in an example embodiment, after scanning one transmit channel (or one group of transmit channels), when scanning a next transmit channel (or a group of transmit channels), the touch chip immediately transmits, to the touch drive module, touch data obtained by scanning the transmit channel. That is, a hardware scanning process and a touch data transmission process are performed synchronously.

Figure 9:
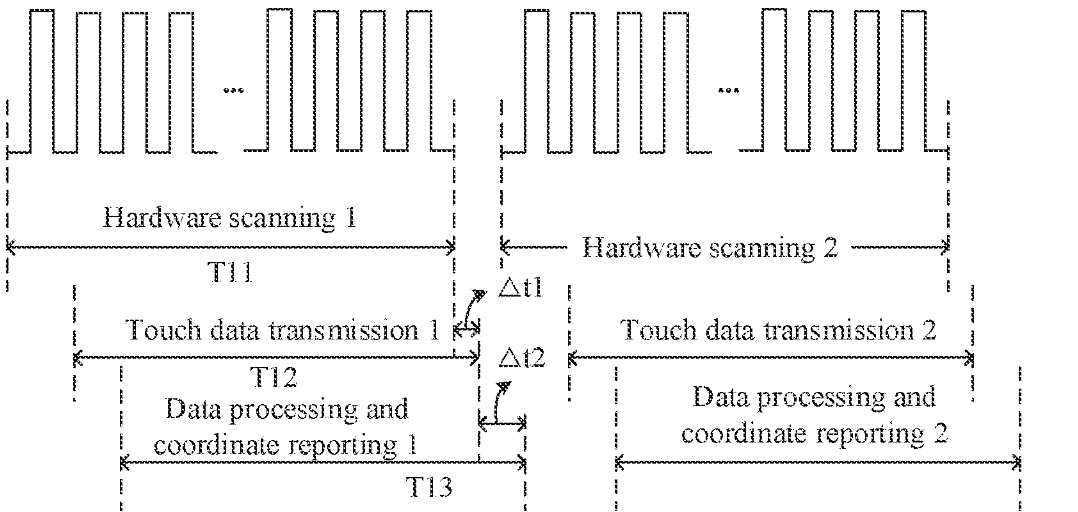
FIG. 9 is a time sequence diagram of processes for performing a touch response by using the method shown in FIG. 8.

As shown in FIG. 9, T11 is time required in a process of hardware scanning 1, T12 is time required in a process of touch data transmission 1, and T11 and T12 partially overlap. A part of T12 that exceeds T11 is denoted as Δt1, and Δt1 is time required for transmitting the last piece of (or the last group of) touch data after all transmit channels are scanned.

S23. The touch drive module transmits the at least one piece of (or one group of) touch data to a touch algorithm module.

Each time after receiving a part of (for example, one piece of or one group of) touch data, the touch drive module immediately sends the touch data to the touch algorithm module at a kernel layer.

S24. The touch algorithm module performs executable processing on the part of received touch data until all touch data is received, then obtains touch location information, and transmits the touch location information to the touch drive module.

For example, the touch algorithm module may include a touch data preprocessing algorithm and an algorithm used to calculate a touch location.

The touch data preprocessing algorithm is used to preprocess the touch data, for example, filtering and compensation. The algorithm used to calculate a touch location is used to obtain, based on all preprocessed touch data, the touch location information corresponding to a touch operation.

In an example embodiment of this application, the touch data preprocessing algorithm may be used to first process the part of received touch data. For example, the touch data preprocessing algorithm may include but is not limited to a vertical filtering algorithm, a corner compensation algorithm, and the like. These algorithms may be used to process only a part of touch data.

After all touch data corresponding to a current round of scanning is processed, location information, namely, touch coordinates, of the touch operation on the touch control screen is obtained through calculation based on all preprocessed touch data. In addition, a tilt angle between a finger and the touch control screen and touch pressure may be further obtained through calculation. Then, the touch algorithm module transmits the obtained touch location information to the touch drive module.

In this embodiment, after receiving a part of touch data of the current round of scanning, the touch algorithm module immediately performs a corresponding preprocessing process on the part of touch data, namely, a process of data processing and coordinate reporting 1 shown in FIG. 9.

As shown in FIG. 9, duration required in the process of data processing and coordinate reporting 1 may be denoted as T13, and duration required in the process of touch data transmission 1 may be denoted as T12. In addition, a time period shown by T13 and a time period shown by T12 partially overlap, where a part of T13 that exceeds T12 is denoted as Δt2, and Δt2 represents additional duration required for processing touch data after all touch data is transmitted to the touch algorithm module. It may be learned that, in this embodiment, total time required for completing one touch coordinate reporting process is T11+Δt1+Δt2.

S25. The touch drive module transmits the touch location information to an Input module.

After receiving the touch location information sent by the touch algorithm module, the touch drive module immediately sends the touch location information to the Input module at an application framework layer.

S26. The Input module reports the touch location information to an application.

The Input module reports the received touch location information to a target application, for example, the game APP in the scenario shown in FIG. 1.

According to the method for increasing a touch response speed provided in this embodiment, after a part of touch data is transmitted to the touch algorithm module, the part of touch data is immediately processed, that is, the touch data is processed in advance, so that the hardware scanning process, the touch data transmission process, and the touch data processing process are performed synchronously. After preprocessing is performed on the touch data, time (namely, additional time required in the data processing process) required in a process of obtaining the touch coordinates through calculation based on preprocessed data is far less than time required in an entire processing process of the touch algorithm module. It may be learned that, in this embodiment, additional time required in the touch data processing process is further shortened on the basis of shortening additional time required for transmitting touch data. Therefore, in this embodiment, time required in an entire touch response process is further shortened, that is, a touch response speed is further increased.

Figure 10:
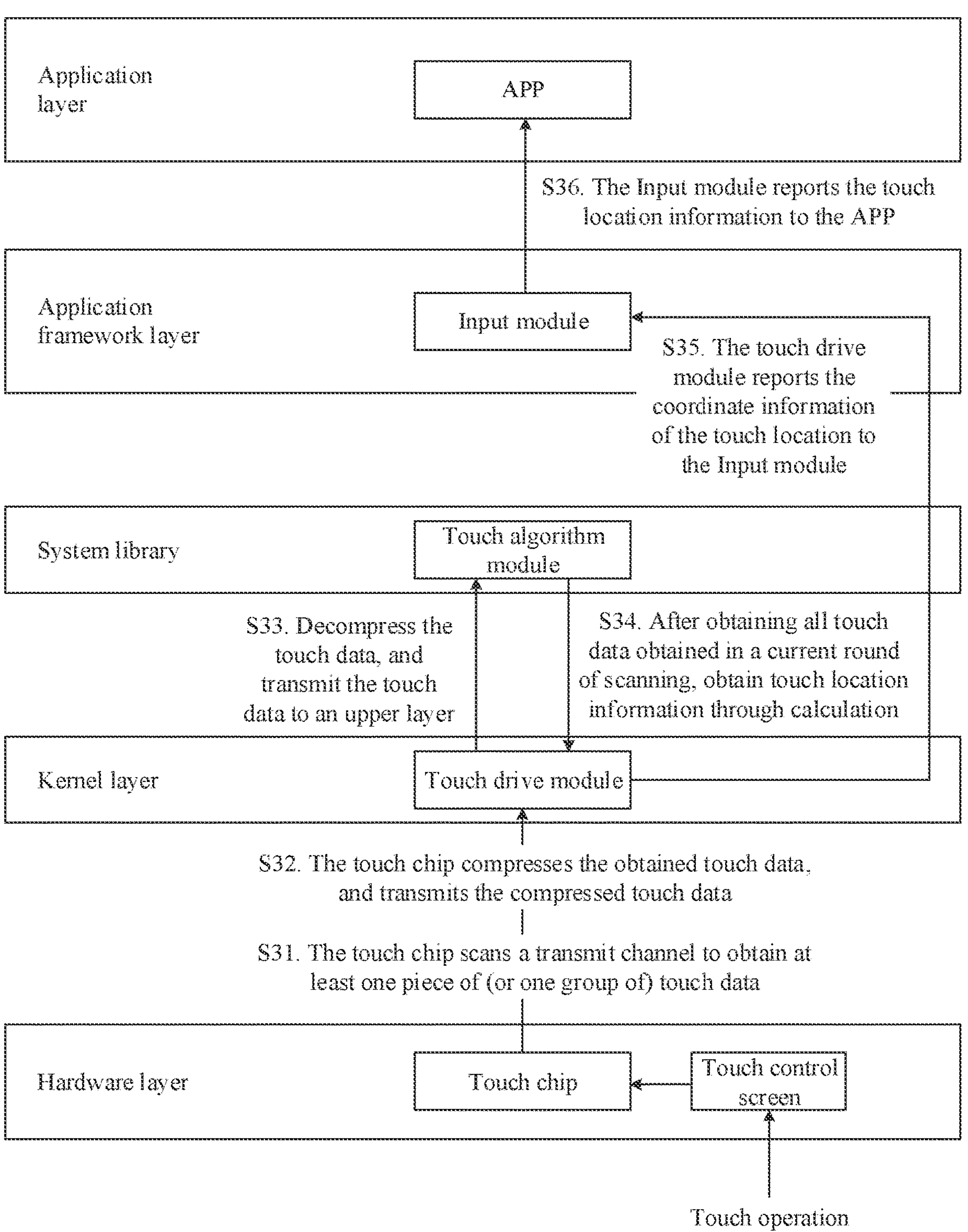
FIG. 10 is a flowchart of still another method for increasing a touch response speed according to an embodiment of this application.

In another embodiment of this application, compression processing may be further performed on to-be-transmitted touch data on the basis of the embodiment shown in FIG. 6, thereby reducing an amount of to-be-transmitted data, and further reducing additional time required for transmitting touch data. As shown in FIG. 10, the method may include the following steps:

S31. A touch chip scans a transmit channel to obtain at least one piece of (or one group of) touch data.

For a process of step S31 in this embodiment, refer to the process of step S11 in the embodiment shown in FIG. 6. Details are not described herein again.

S32. The touch chip compresses the obtained touch data, and sends the compressed touch data to a touch drive module.

A compression algorithm is integrated into the touch chip, and the compression algorithm is used to compress touch data obtained by scanning a part of transmit channels, and send the compressed touch data to the touch drive module.

A data amount of the compressed touch data is less than a data amount of uncompressed touch data. Therefore, time required for transmitting the compressed data is less than time required for transmitting the uncompressed touch data, thereby further reducing time consumed in a data transmission process.

S33. The touch drive module decompresses the received compressed touch data, and transmits the decompressed touch data to a touch algorithm module.

A corresponding decompression algorithm is integrated into the touch drive module in advance. The decompression algorithm matches the compression algorithm in the touch chip, that is, the decompression algorithm may be used to decompress the compressed data transmitted by the touch chip, to obtain original data. Further, the decompressed data is transmitted to the touch algorithm module.

S34. After receiving all touch data obtained in a current round of scanning, the touch algorithm module processes the touch data to obtain touch location information, and transmits the touch location information to the touch drive module.

S35. The touch drive module transmits the obtained touch location information to an Input module.

S36. The Input module reports the touch location information to an APP.

For processes of S34~S36 in this embodiment, refer to steps S24~S26 in the embodiment shown in FIG. 6. Details are not described herein again.

According to the method for increasing a touch response speed provided in this embodiment, after a part of transmit channels are scanned to obtain a part of touch data, the part of touch data is further compressed, and the compressed data is transmitted to an application processor. In this method, touch data transmission and transmit channel scanning are performed synchronously, and compression processing is performed before the touch data is transmitted, so that additional time required in the data transmission process is further shortened. Therefore, time consumed in an entire touch response process is further reduced, and a response speed of a touch operation is further increased.

Figure 11:
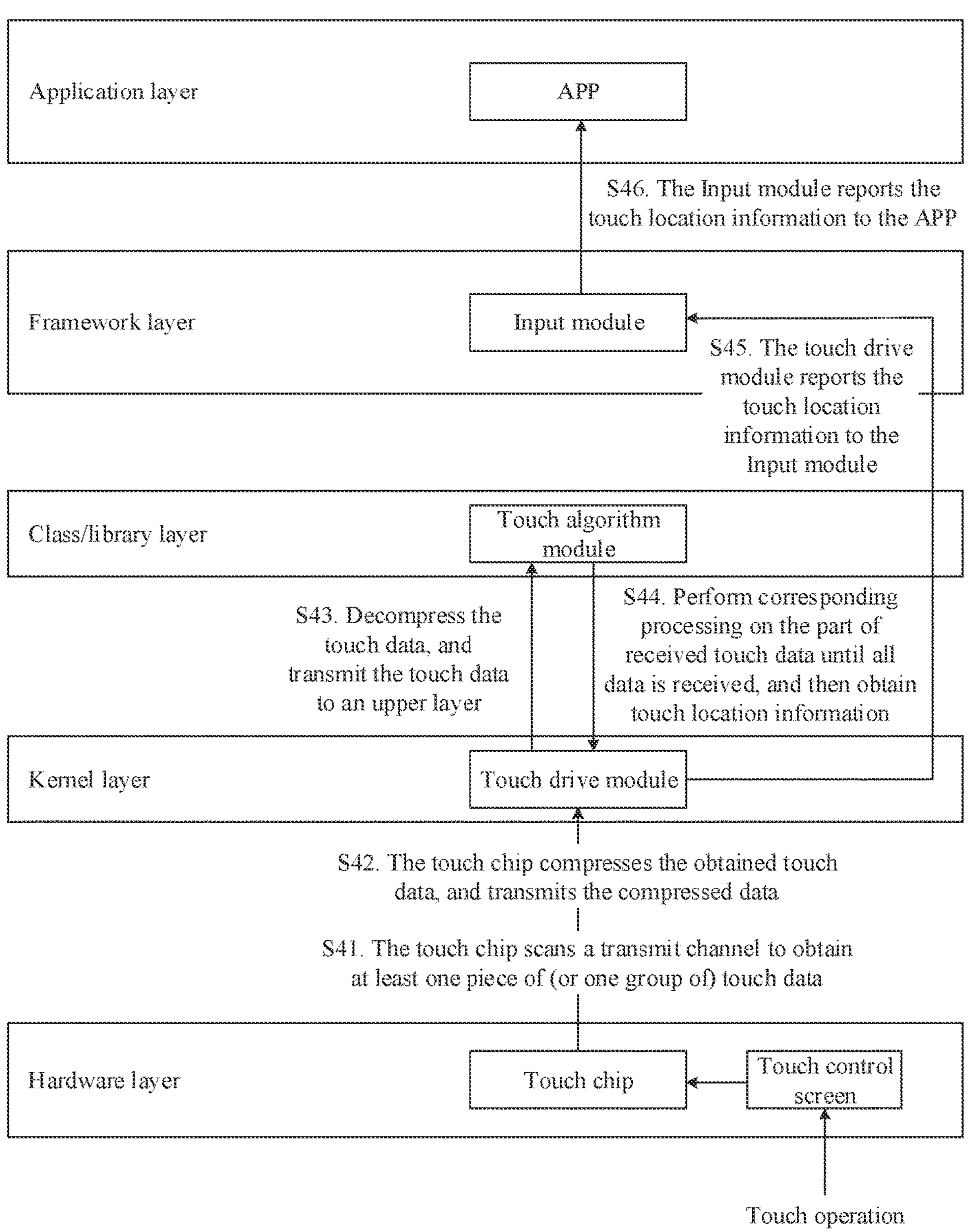
FIG. 11 is a flowchart of yet another method for increasing a touch response speed according to an embodiment of this application.

In still another embodiment of this application, compression processing may be further performed on to-be-transmitted touch data on the basis of the embodiment shown in FIG. 9, thereby reducing a data amount of to-be-transmitted data, and further reducing additional time required for transmitting touch data. As shown in FIG. 11, the method may include the following steps:

S41. A touch chip scans a transmit channel to obtain a part of touch data.

Each time after scanning a part of transmit channels, the touch chip obtains capacitance data on a receive channel, and the data is also referred to as touch data.

S42. The touch chip compresses the obtained touch data, and sends the compressed touch data to a touch drive module.

In an example embodiment, each time after scanning one transmit channel (or one group of transmit channels), the touch chip immediately compresses obtained touch data, and sends the compressed data to the touch drive module.

It may be learned that, in this embodiment, on the basis of partially performing a hardware scanning process and a data transmission process synchronously, compression processing is further performed on to-be-transmitted touch data before data is transmitted, thereby reducing an amount of to-be-transmitted data, and further reducing additional time required for data transmission.

S43. The touch drive module decompresses the received compressed touch data, and transmits the decompressed touch data to a touch algorithm module.

For a process of step S43 shown in this embodiment, refer to the process of S33 in the embodiment shown in FIG. 10. Details are not described herein again.

S44. The touch algorithm module performs corresponding processing on the part of received touch data until all touch data is received, then obtains touch location information, and transmits the touch location information to the touch drive module.

In this embodiment, after receiving a part of touch data, the touch algorithm module immediately performs executable processing (for example, vertical filtering and corner compensation), and does not need to perform processing after all the touch data is received, so that the data processing process and the hardware scanning process are partially performed synchronously. Therefore, additional time required in a data processing process is shortened.

S45. The touch drive module transmits the touch location information to an Input module.

S46. The Input module reports the touch location information to an application.

Specific implementation processes of S44~S46 in this embodiment are the same as processes of steps S24~S26 in the embodiment shown in FIG. 9. Details are not described herein again.

According to the method for increasing a touch response speed provided in this embodiment, after a part of transmit channels are scanned to obtain a part of corresponding touch data, the part of touch data is further compressed, and the compressed data is transmitted to an upper layer. In this method, on the basis of synchronously performing touch data transmission and transmit channel scanning, compression processing is further performed before the touch data is transmitted, thereby further shortening additional time required in a data transmission process. In addition, after receiving a part of touch data, the touch algorithm module immediately performs executable processing, and does not need to perform processing after all touch data is received, thereby further reducing additional time required in the data processing process. Therefore, time consumed in an entire touch response process is further reduced, and a response speed of a touch operation is further increased.

Through the descriptions of the foregoing implementations, a person skilled in the art can clearly understand that for the purpose of convenient and brief description, only division of the foregoing functional modules is used as an example for description. In actual application, the functions may be allocated to and completed by different functional modules as required. In other words, an internal structure of the apparatus is divided into different functional modules, to complete all or some of the functions described above. For specific working processes of the system, apparatus, and unit described above, refer to corresponding processes in the foregoing method embodiments. Details are not described herein again.

In the several embodiments provided in the embodiments, it should be understood that the disclosed system, apparatus, and method may be implemented in other manners. For example, the described apparatus embodiment is merely an example. For example, the module or unit division is merely logical function division, and there may be another division manner in actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in an electrical, mechanical, or another form.

The units described as separate components may or may not be physically separated, and components displayed as units may or may not be physical units, that is, may be located in one place, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the embodiments essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

The invention claimed is:

1. A method for increasing a touch response speed, applied to an electronic device, wherein the electronic device comprises a touchscreen, a touch chip, and an application processor, the touchscreen comprises a plurality of transmit channels and a plurality of receive channels, and the method comprises:

scanning, by the touch chip, one transmit channel group to obtain a touch data set, wherein a quantity of transmit channels comprised in the transmit channel group is less than a quantity of all transmit channels of the touchscreen, and the touch data set comprises parameters of equivalent capacitances between all receive channels and currently scanned transmit channels;

transmitting, by the touch chip, the touch data set to the application processor while scanning, by the touch chip, a next transmit channel group until all transmit channel groups are scanned, wherein the scanning the next transmit channel group and the transmitting the touch data set are performed in parallel such that a scanning period of the next transmit channel group at least partially overlaps with a touch data transmission period of the touch data set; and sequentially receiving, by the application processor, touch data sets corresponding to the transmit channel groups, until the touch data sets corresponding to all the transmit channel groups are received, and then obtaining touch location information corresponding to a touch operation on the touchscreen, wherein the sequentially receiving, by the application processor, the touch data sets corresponding to the transmit channel groups, until the touch data sets corresponding to all the transmit channel groups are received, and then obtaining the touch location information corresponding to the touch operation on the touchscreen comprises:

after receiving a touch data set corresponding to one transmit channel group, processing, by the application processor, the touch data set by using a touch data preprocessing algorithm, until the touch data sets corresponding to all the transmit channel groups are received, and then obtaining, through calculation based on the touch data sets corresponding to all the transmit channel groups, the touch location information corresponding to the touch operation.

2. The method according to claim 1, wherein the transmitting, by the touch chip, the touch data set to the application processor comprises: performing, by the touch chip, compression processing on the touch data set by using a preset compression algorithm, and transmitting compressed touch data to the application processor; and the sequentially receiving, by the application processor, touch data sets corresponding to the transmit channel groups, until the touch data sets corresponding to all the transmit channel groups are received, and obtaining touch location information corresponding to a touch operation on the touchscreen comprises:

after receiving the compressed touch data, performing, by the application processor, decompression processing on the compressed touch data by using a preset decompression algorithm; and after receiving decompressed touch data corresponding to all the transmit channel groups, obtaining, by the application processor through calculation, the touch location information corresponding to the touch operation.

3. The method according to claim 1, wherein the transmit channel group comprises one transmit channel, and the touch data set is one piece of touch data obtained by scanning one transmit channel; and the scanning, by the touch chip in a process of transmitting the touch data set to the application processor, a next transmit channel group until all transmit channel groups are scanned comprises:

in a process in which the touch chip transmits one piece of obtained touch data to the application processor, continuing, by the touch chip, to scan a next transmit channel group until all the transmit channel groups are scanned.

4. The method according to claim 1, wherein the transmit channel group comprises a plurality of transmit channels, and the touch data set is one group of touch data obtained by scanning a plurality of transmit channels; and the scanning, by the touch chip in a process of transmitting the touch data set to the application processor, a next transmit channel group until all transmit channel groups are scanned comprises:

in a process in which the touch chip transmits one group of obtained touch data to the application processor, sequentially scanning, by the touch chip, transmit channels in a next transmit channel group, until all the transmit channel groups are scanned; or in a process in which the touch chip transmits one group of obtained touch data to the application processor, simultaneously scanning, by the touch chip, transmit channels in a next transmit channel group, until all the transmit channel groups are scanned.

5. The method according to claim 1, wherein a touch drive module and a touch algorithm module are run in the application processor;

the transmitting, by the touch chip, the touch data set to the application processor comprises: transmitting, by the touch chip, the touch data set to the touch drive module; and the sequentially receiving, by the application processor, touch data sets corresponding to the transmit channel groups, until the touch data sets corresponding to all the transmit channel groups are received, and then obtaining touch location information corresponding to a touch operation on the touchscreen comprises:

sequentially receiving, by the touch drive module, touch data sets corresponding to transmit channels, and transmitting the touch data sets to the touch algorithm module; and sequentially receiving, by the touch algorithm module, the touch data sets corresponding to the transmit channels, and obtaining, based on the touch data corresponding to all the transmit channels, the touch location information corresponding to the touch operation.

6. The method according to claim 5, wherein the transmitting, by the touch chip, the touch data set to the touch drive module comprises: performing, by the touch chip, compression processing on the touch data set by using the preset compression algorithm, and transmitting compressed touch data to the touch drive module; and the sequentially receiving, by the touch drive module, touch data sets corresponding to transmit channels, and transmitting the touch data sets to the touch algorithm module comprises: after receiving the compressed touch data, performing, by the touch drive module, decompression processing on the compressed touch data by using the preset decompression algorithm, and transmitting decompressed data to the touch algorithm module.

7. The method according to claim 6, wherein the sequentially receiving, by the touch algorithm module, the touch data sets corresponding to the transmit channels, and obtaining, based on the touch data corresponding to all the transmit channels, the touch location information corresponding to the touch operation comprises:

after receiving a touch data set corresponding to one transmit channel group, processing, by the touch algorithm module, the touch data set by using the touch data preprocessing algorithm, until the touch data sets corresponding to all the transmit channel groups are received, and then obtaining, through calculation based on the touch data sets corresponding to all the transmit channel groups, the touch location information corresponding to the touch operation.

8. The method according to claim 5, wherein an input module and a first application are run in the application processor, and the method further comprises:

transmitting, by the touch algorithm module, the touch location information to the input module by using the touch drive module; and transmitting, by the input module, the touch location information to the first application, so that the first application responds to the touch operation based on the touch location information, wherein the first application is an application that is run in the foreground of the electronic device.

9. An electronic device, wherein the electronic device comprises one or more processors, a memory, and a touchscreen, the memory is configured to store program code, and the processor is configured to run the program code, to enable the electronic device to implement operations; wherein the touchscreen comprises a plurality of transmit channels and a plurality of receive channels; wherein the comprise:

scanning, by the touch chip, one transmit channel group to obtain a touch data set, wherein a quantity of transmit channels comprised in the transmit channel group is less than a quantity of all transmit channels of the touchscreen, and the touch data set comprises parameters of equivalent capacitances between all receive channels and currently scanned transmit channels;

transmitting, by the touch chip, the touch data set to the application processor while scanning, by the touch chip, a next transmit channel group until all transmit channel groups are scanned, wherein the scanning the next transmit channel group and the transmitting the touch data set are performed in parallel such that a scanning period of the next transmit channel group at least partially overlaps with a touch data transmission period of the touch data set; and sequentially receiving, by the application processor, touch data sets corresponding to the transmit channel groups, until the touch data sets corresponding to all the transmit channel groups are received, and then obtaining touch location information corresponding to a touch operation on the touchscreen, wherein the sequentially receiving, by the application processor, the touch data sets corresponding to the transmit channel groups, until the touch data sets corresponding to all the transmit channel groups are received, and then obtaining the touch location information corresponding to the touch operation on the touchscreen comprises:

after receiving a touch data set corresponding to one transmit channel group, processing, by the application processor, the touch data set by using a touch data preprocessing algorithm, until the touch data sets corresponding to all the transmit channel groups are received, and then obtaining, through calculation based on the touch data sets corresponding to all the transmit channel groups, the touch location information corresponding to the touch operation.

10. The electronic device according to claim 9, wherein the transmitting, by the touch chip, the touch data set to the application processor comprises: performing, by the touch chip, compression processing on the touch data set by using a preset compression algorithm, and transmitting compressed touch data to the application processor; and the sequentially receiving, by the application processor, touch data sets corresponding to the transmit channel groups, until the touch data sets corresponding to all the transmit channel groups are received, and obtaining touch location information corresponding to a touch operation on the touchscreen comprises:

after receiving the compressed touch data, performing, by the application processor, decompression processing on the compressed touch data by using a preset decompression algorithm; and after receiving decompressed touch data corresponding to all the transmit channel groups, obtaining, by the application processor through calculation, the touch location information corresponding to the touch operation.

11. The electronic device according to claim 9, wherein the transmit channel group comprises one transmit channel, and the touch data set is one piece of touch data obtained by scanning one transmit channel; and the scanning, by the touch chip in a process of transmitting the touch data set to the application processor, a next transmit channel group until all transmit channel groups are scanned comprises:

in a process in which the touch chip transmits one piece of obtained touch data to the application processor, continuing, by the touch chip, to scan a next transmit channel group until all the transmit channel groups are scanned.

12. The electronic device according to claim 9, wherein the transmit channel group comprises a plurality of transmit channels, and the touch data set is one group of touch data obtained by scanning a plurality of transmit channels; and the scanning, by the touch chip in a process of transmitting the touch data set to the application processor, a next transmit channel group until all transmit channel groups are scanned comprises:

in a process in which the touch chip transmits one group of obtained touch data to the application processor, sequentially scanning, by the touch chip, transmit channels in a next transmit channel group, until all the transmit channel groups are scanned; or in a process in which the touch chip transmits one group of obtained touch data to the application processor, simultaneously scanning, by the touch chip, transmit channels in a next transmit channel group, until all the transmit channel groups are scanned.

13. The electronic device according to claim 9, wherein a touch drive module and a touch algorithm module are run in the application processor;

the transmitting, by the touch chip, the touch data set to the application processor comprises: transmitting, by the touch chip, the touch data set to the touch drive module; and the sequentially receiving, by the application processor, touch data sets corresponding to the transmit channel groups, until the touch data sets corresponding to all the transmit channel groups are received, and then obtaining touch location information corresponding to a touch operation on the touchscreen comprises:

sequentially receiving, by the touch drive module, touch data sets corresponding to transmit channels, and transmitting the touch data sets to the touch algorithm module; and sequentially receiving, by the touch algorithm module, the touch data sets corresponding to the transmit channels, and obtaining, based on the touch data corresponding to all the transmit channels, the touch location information corresponding to the touch operation.

14. The electronic device according to claim 13, wherein the transmitting, by the touch chip, the touch data set to the touch drive module comprises: performing, by the touch chip, compression processing on the touch data set by using the preset compression algorithm, and transmitting compressed touch data to the touch drive module; and the sequentially receiving, by the touch drive module, touch data sets corresponding to transmit channels, and transmitting the touch data sets to the touch algorithm module comprises: after receiving the compressed touch data, performing, by the touch drive module, decompression processing on the compressed touch data by using the preset decompression algorithm, and transmitting decompressed data to the touch algorithm module.

15. The electronic device according to claim 14, wherein the sequentially receiving, by the touch algorithm module, the touch data sets corresponding to the transmit channels, and obtaining, based on the touch data corresponding to all the transmit channels, the touch location information corresponding to the touch operation comprises:

after receiving a touch data set corresponding to one transmit channel group, processing, by the touch algorithm module, the touch data set by using the touch data preprocessing algorithm, until the touch data sets corresponding to all the transmit channel groups are received, and then obtaining, through calculation based on the touch data sets corresponding to all the transmit channel groups, the touch location information corresponding to the touch operation.

16. The electronic device according to claim 13, wherein an input module and a first application are run in the application processor, and the operations further comprise:

transmitting, by the touch algorithm module, the touch location information to the input module by using the touch drive module; and transmitting, by the input module, the touch location information to the first application, so that the first application responds to the touch operation based on the touch location information, wherein the first application is an application that is run in the foreground of the electronic device.

17. A non-transitory computer-readable storage medium, storing instructions, wherein when the instructions are run on an electronic device, wherein the electronic device comprises a touchscreen, a touch chip, and an application processor, the touchscreen comprises a plurality of transmit channels and a plurality of receive channels; the electronic device is enabled to perform operations comprising:

scanning, by the touch chip, one transmit channel group to obtain a touch data set, wherein a quantity of transmit channels comprised in the transmit channel group is less than a quantity of all transmit channels of the touchscreen, and the touch data set comprises parameters of equivalent capacitances between all receive channels and currently scanned transmit channels;

transmitting, by the touch chip, the touch data set to the application processor while scanning, by the touch chip, a next transmit channel group until all transmit channel groups are scanned, wherein the scanning the next transmit channel group and the transmitting the touch data set are performed in parallel such that a scanning period of the next transmit channel group at least partially overlaps with a touch data transmission period of the touch data set; and sequentially receiving, by the application processor, touch data sets corresponding to the transmit channel groups, until the touch data sets corresponding to all the transmit channel groups are received, and then obtaining touch location information corresponding to a touch operation on the touchscreen, wherein the sequentially receiving, by the application processor, the touch data sets corresponding to the transmit channel groups, until the touch data sets corresponding to all the transmit channel groups are received, and then obtaining the touch location information corresponding to the touch operation on the touchscreen comprises:

after receiving a touch data set corresponding to one transmit channel group, processing, by the application processor, the touch data set by using a touch data preprocessing algorithm, until the touch data sets corresponding to all the transmit channel groups are received, and then obtaining, through calculation based on the touch data sets corresponding to all the transmit channel groups, the touch location information corresponding to the touch operation.

18. The non-transitory computer-readable storage medium according to claim 17, wherein the transmitting, by the touch chip, the touch data set to the application processor comprises: performing, by the touch chip, compression processing on the touch data set by using a preset compression algorithm, and transmitting compressed touch data to the application processor; and the sequentially receiving, by the application processor, touch data sets corresponding to the transmit channel groups, until the touch data sets corresponding to all the transmit channel groups are received, and obtaining touch location information corresponding to a touch operation on the touchscreen comprises:

after receiving the compressed touch data, performing, by the application processor, decompression processing on the compressed touch data by using a preset decompression algorithm; and after receiving decompressed touch data corresponding to all the transmit channel groups, obtaining, by the application processor through calculation, the touch location information corresponding to the touch operation.

19. The non-transitory computer-readable storage medium according to claim 17, wherein the transmit channel group comprises one transmit channel, and the touch data set is one piece of touch data obtained by scanning one transmit channel; and the scanning, by the touch chip in a process of transmitting the touch data set to the application processor, a next transmit channel group until all transmit channel groups are scanned comprises:

in a process in which the touch chip transmits one piece of obtained touch data to the application processor, continuing, by the touch chip, to scan a next transmit channel group until all the transmit channel groups are scanned.

* * * * *